US010745209B2

(12) United States Patent
Hirata

(10) Patent No.: US 10,745,209 B2
(45) Date of Patent: Aug. 18, 2020

(54) WORKPIECE INVERTING DEVICE

(71) Applicant: KAWASAKI JUKOGYO KABUSHIKI KAISHA, Kobe-shi, Hyogo (JP)

(72) Inventor: Kazunori Hirata, Yao (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 0 days.

(21) Appl. No.: 16/315,103

(22) PCT Filed: Jun. 30, 2017

(86) PCT No.: PCT/JP2017/024219
§ 371 (c)(1),
(2) Date: Jan. 3, 2019

(87) PCT Pub. No.: WO2018/008559
PCT Pub. Date: Jan. 11, 2018

(65) Prior Publication Data
US 2019/0337730 A1    Nov. 7, 2019

(30) Foreign Application Priority Data
Jul. 4, 2016 (JP) ................................. 2016-132830

(51) Int. Cl.
*B65G 47/248* (2006.01)
*B25J 15/00* (2006.01)

(52) U.S. Cl.
CPC ........ *B65G 47/248* (2013.01); *B25J 15/0095* (2013.01)

(58) Field of Classification Search
CPC ........ B25J 9/1035; B25J 9/041; B25J 9/0087; B25J 9/06; B25J 9/0093; B65G 47/248; B65G 47/847; Y10T 74/18808; Y10T 74/1967; Y10T 74/18976; B23Q 5/385;
(Continued)

(56) References Cited

U.S. PATENT DOCUMENTS 2,259,728 A * 10/1941 Bridges ................... C03B 23/24
118/425
2,371,748 A *  3/1945 Fedorchak ........... B65G 47/847
198/378
(Continued)

FOREIGN PATENT DOCUMENTS

EP          2774728 A2    9/2014
JP       H02-059248 A    2/1990
(Continued)

*Primary Examiner* — Gregory W Adams
(74) *Attorney, Agent, or Firm* — Oliff PLC

(57) ABSTRACT

A workpiece inverting device includes a gripping part configured to rotatably grip a workpiece, a rotary body rotatable about a rotating shaft and connected to the gripping part, a strip member extending in a direction orthogonal to the rotating shaft, and an arm configured to move in one of a state in which a tip of the arm is provided with the gripping part and the rotary body and a state in which the tip of the arm is provided with the strip member. While the workpiece is gripped by the gripping member, the rotary body moves relative to the strip member in contact with the rotary body in the direction in which the strip member extends.

2 Claims, 7 Drawing Sheets

(58) Field of Classification Search
CPC ..... B23Q 7/165; Y10S 901/08; Y10S 901/14; B21D 43/145
See application file for complete search history.

(56) References Cited

U.S. PATENT DOCUMENTS

| | | | | |
|---|---|---|---|---|
| 4,042,122 A * | 8/1977 | Espy | ................... | B25J 15/0004 |
| | | | | 414/728 |
| 4,702,668 A * | 10/1987 | Carlisle | ................... | B25J 9/044 |
| | | | | 414/744.5 |
| 4,762,455 A * | 8/1988 | Coughlan | ................. | B25J 3/04 |
| | | | | 376/248 |
| 4,881,868 A * | 11/1989 | Alameda | ............... | B65B 13/022 |
| | | | | 414/773 |
| 4,921,387 A * | 5/1990 | Bennington | ......... | B21D 43/105 |
| | | | | 198/468.6 |
| 5,403,146 A * | 4/1995 | Jones | ....................... | B23Q 7/04 |
| | | | | 414/729 |
| 5,435,688 A * | 7/1995 | Tokunaga | .............. | A24C 5/356 |
| | | | | 414/403 |
| 7,558,646 B2 * | 7/2009 | Matsumoto | ............ | B25J 9/1682 |
| | | | | 318/484 |
| 8,886,358 B2 * | 11/2014 | Sato | ........................ | B25J 9/1669 |
| | | | | 700/253 |
| 9,156,160 B2 * | 10/2015 | Nagai | .................... | B25J 9/0084 |
| 2014/0288706 A1* | 9/2014 | Asahi | ..................... | B25J 9/1656 |
| | | | | 700/250 |
| 2015/0209923 A1 | 7/2015 | Jia | | |
| 2017/0336776 A1 | 11/2017 | Watanabe et al. | | |

FOREIGN PATENT DOCUMENTS

| | | |
|---|---|---|
| JP | H06-91349 A | 4/1994 |
| JP | 2011-156621 A | 8/2011 |
| JP | 2012-091880 A | 5/2012 |
| JP | 2013-71828 A | 4/2013 |
| JP | 2014-172099 A | 9/2014 |
| TW | 201529458 A | 8/2015 |
| WO | 2016/103307 A1 | 6/2016 |

* cited by examiner

WORKPIECE INVERTING DEVICE

TECHNICAL FIELD

The present disclosure relates to a workpiece inverting device which inverts a workpiece.

BACKGROUND ART

A workpiece inverting device disclosed in Patent Document 1, which is an example of conventional workpiece inverting devices, places a workpiece on an inversion tray. When a lever handle connected to the inversion tray is pulled up, the inversion tray revolves about an inversion axis. A rocking tray accordingly moves downward, so that the workpiece is sandwiched between the inversion tray and the rocking tray. Then, the inversion tray and the rocking tray integrally revolve about a pivot which is a rocking shaft provided to an end of the rocking tray, and the workpiece is thus rotated 180° so as to be turned upside down.

REFERENCE DOCUMENT OF CONVENTIONAL ART

Patent Document

[Patent Document 1] JP2012-091880A

DESCRIPTION OF THE DISCLOSURE

Problems to be Solved by the Disclosure

With regard to the workpiece inverting device disclosed in Patent Document 1, the inversion axis is provided to one end of the inversion tray and the lever handle is provided to the other end of the inversion tray. This structure in which the lever handle is located away from the inversion axis requires a large movement of the lever handle relative to the inversion axis. The larger the workpiece is, the larger the movement is.

The present disclosure is made in view of solving the above problems, and one purpose thereof is to provide a workpiece inverting device capable of inverting a workpiece in a small space.

SUMMARY OF THE DISCLOSURE

In order to achieve the purpose, a workpiece inverting device is provided, which includes a gripping part configured to rotatably grip a workpiece, a rotary body rotatable about a rotating shaft and connected to the gripping part, a strip member extending in a direction orthogonal to the rotating shaft, and an arm configured to move in one of a state in which a tip of the arm is provided with the gripping part and the rotary body and a state in which the tip of the arm is provided with the strip member. While the workpiece is gripped by the gripping member, the rotary body moves relative to the strip member in contact with the rotary body in the direction in which the strip member extends. According to this, since the rotary body provided with the rotating shaft is moved with the strip member, a motion which enables inversion of the workpiece is possible in a small place irrespective of the size of the workpiece.

The gripping part may be a first gripping part and the arm may be a first arm. The first arm may have the first gripping part and the rotary body at a tip thereof. The workpiece inverting device may further include a second arm configured to move in a state in which a tip of the second arm is provided with a second gripping part configured to rotatably grip the workpiece. While the workpiece is gripped by the first gripping part and the second gripping part, the rotary body may move relative to the strip member in contact with the rotary body in the direction in which the strip member extends. According to this, the workpiece is gripped by the first and second gripping parts and moved by the first and the second arms. In this movement, the workpiece is inverted by the rotary body being moved relative to the strip member. Thus, there is no need to use power source for the movement and inversion of the workpiece.

The rotary body may be a pinion being a cylindrical body having a circumferential surface provided with first teeth. The strip member may be a rack provided with second teeth to engage with the first teeth. According to this, by engaging the first teeth and the second teeth, the rotary body can be surely rotated, enabling an efficient inversion of the workpiece.

The workpiece inverting device may include a robot including the arm. According to this, by using a general-purpose robot with replaceable tips, the inversion of the workpiece is possible only by replacement of these tips.

Effects of the Disclosure

The present disclosure has the structure described above, and thus produces the effects of inverting a workpiece in a small space.

MODES FOR CARRYING OUT THE DISCLOSURE

Preferable embodiments will be described below with reference to the accompanying drawings. Note that, in the following, the same or corresponding elements are denoted by the same referential characters throughout the drawings to omit redundant description. The drawings illustrate each element schematically for easier understandings. Directions parallel to an axis of a base shaft are referred to as vertical (up-and-down) directions.

Embodiment 1

Figure 3:
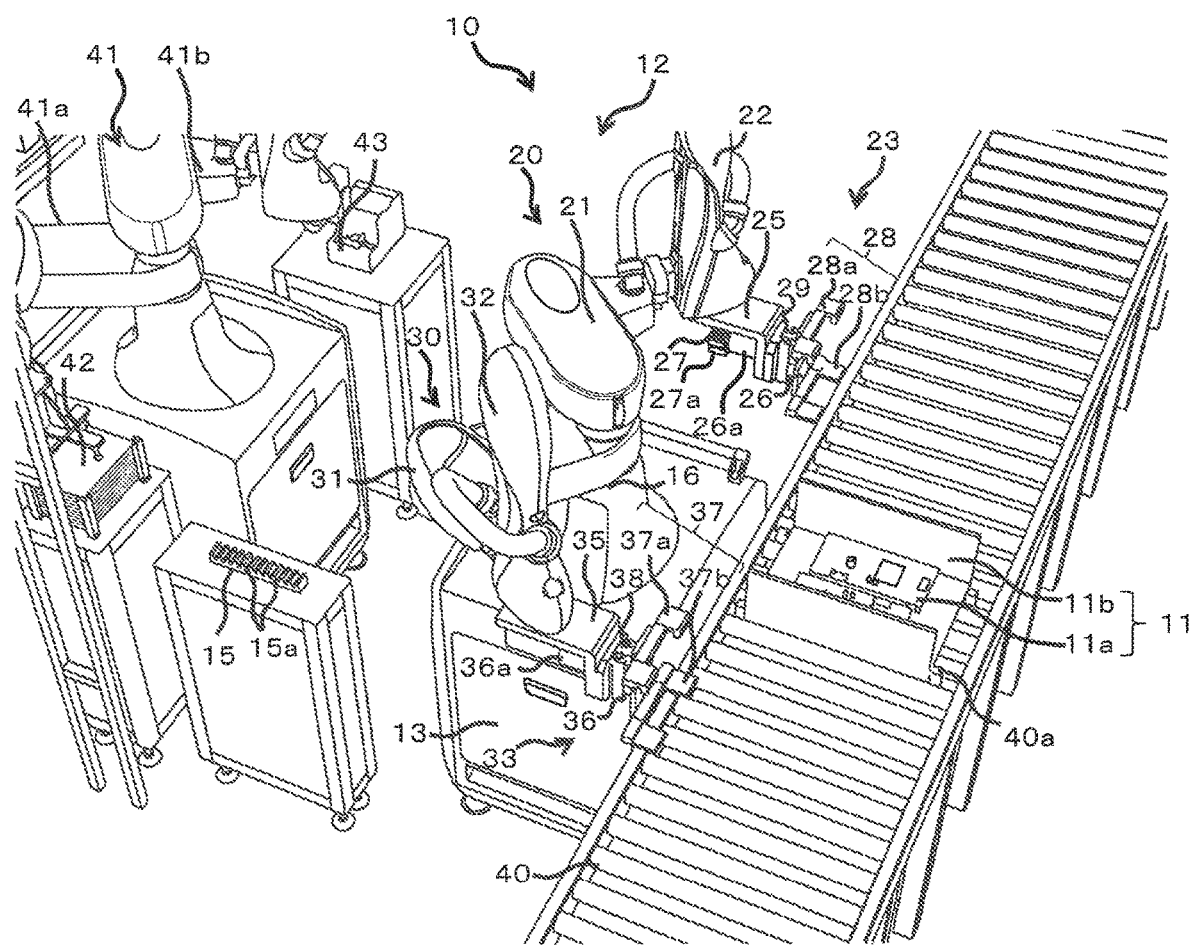
FIG. 3 is a perspective view schematically illustrating a state in which a workpiece is transferred by a conveyor belt.

A workpiece inverting device 10 according to Embodiment 1 is a device capable of inverting a workpiece 11 (see FIG. 3). The following describes the case in which the workpiece inverting device 10 according to the present disclosure includes a robot 12 and a strip member 15 illustrated in FIG. 1. Note that the workpiece inverting device 10 is not limited to the device being the robot 12. As the robot 12, a horizontal articulated dual-arm robot is described below. Note that other robots such as a horizontal articulated robot and a vertical articulated robot may be employed.

Figure 1:
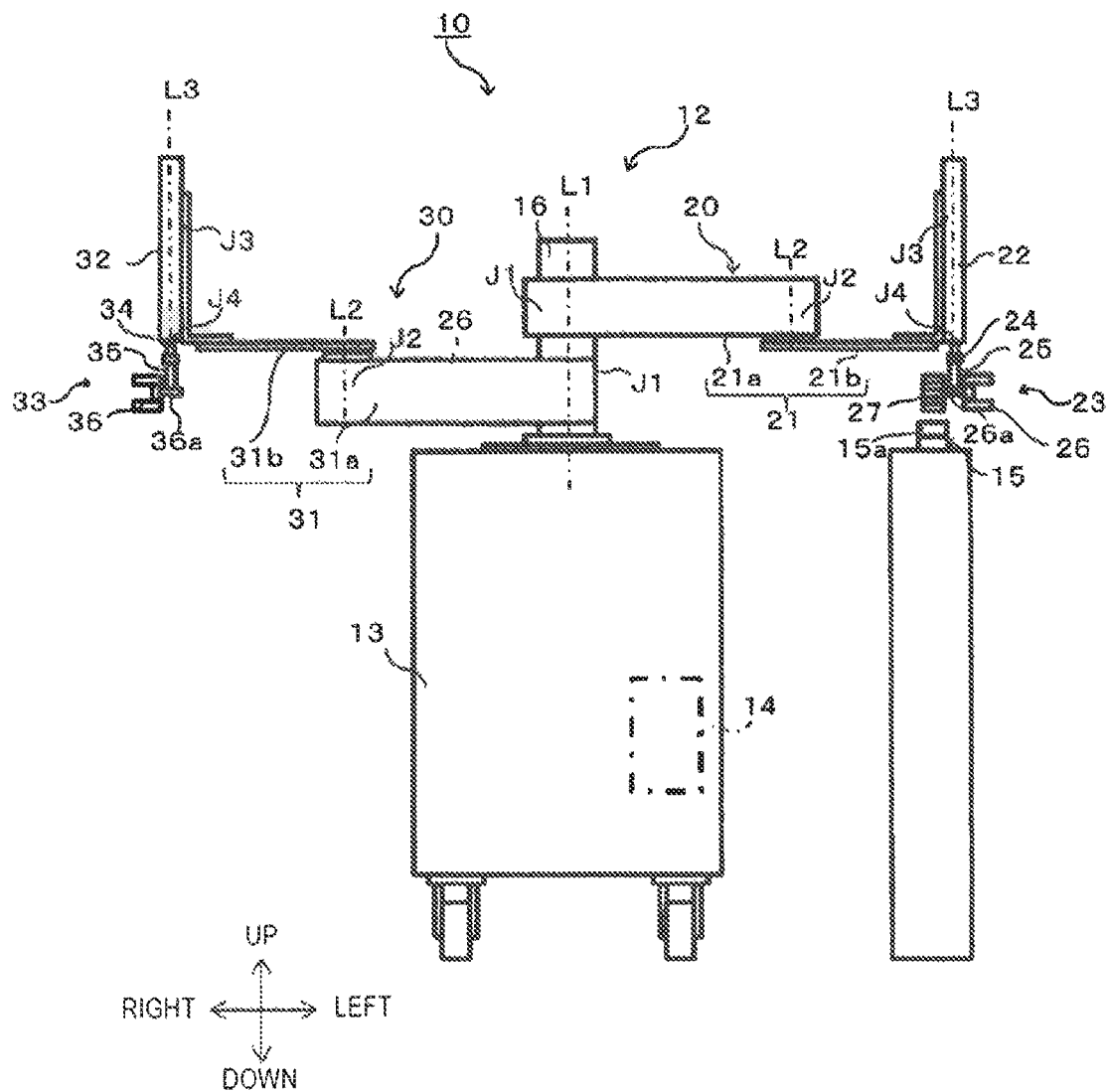
FIG. 1 is a plan view schematically illustrating an overall structure of one example of a robot to which a workpiece inverting device according to Embodiment 1 is applied.

As illustrated in FIG. 1, the robot 12 includes a carriage 13, a pair of robot arms (hereinafter, may simply be referred to as "arms") 20 and 30 supported by the carriage 13, and a controller 14 accommodated inside the carriage 13. The first arm (arm) 20 and the second arm 30 are horizontal articulated robot arms. The first arm 20 includes a first arm part 21, a first wrist part 22, and a first hand part 23. The second arm 30 includes a second arm part 31, a second wrist part 32, and a second hand part 33. Note that the first arm 20 and the second arm 30 may have substantially the same structure except for the first hand part 23 and the second hand part 33. The first arm 20 and the second arm 30 are capable of moving independently of each other and moving in conjunction with each other.

In this example, the first arm part 21 includes a first a-link 21a and a first b-link 21b. In this example, the second arm part 31 includes a second a-link 31a and a second b-link 31b. The first a-link 21a and the second a-link 31a are coupled to a base shaft 16 fixed to an upper surface of the carriage 13 through a rotary joint J1, and is revolvable about a rotation axis L1 passing through the axial center of the base shaft 16. The first b-link 21b is coupled to a tip of the first a-link 21a through a rotary joint J2, and is revolvable about a rotation axis L2 defined at the tip of the first a-link 21a. The second b-link 31b is coupled a tip of the second a-link 31a through a rotary joint J2, and is revolvable about a rotation axis L2 defined at the tip of the second a-link 31a.

The first wrist part 22 is coupled to a tip of the first b-link 21b through a linear-motion joint J3, and is ascendable and descendible with respect to the first b-link 21b. The second wrist part 32 is coupled to a tip of the second b-link 31b through a linear-motion joint J3, and is ascendable and descendible with respect to the second b-link 31b.

The first hand part 23 is coupled to a lower end of the first wrist part 22 through a rotary joint J4, and is revolvable about a rotation axis L3 defined at the lower end of the first wrist part 22. The first hand part 23 includes a first attaching part 24 connected to the first wrist part 22, a first base 25 removably attached to the first attaching part 24, a first gripping part (gripping part) 26 rotatably provided to the first base 25, and a rotary body 27 connected to the first gripping part 26. The first attaching part 24, the first gripping part 26 and the rotary body 27 are provided to a tip of the first arm 20. Details of the first hand part 23 will be described later.

The second hand part 33 is coupled to a lower end of the second wrist part 32 through a rotary joint J4, and is revolvable about a rotation axis L3 defined at the lower end of the second wrist part 32. The second hand part 33 includes a second attaching part 34 connected to the second wrist part 32, a second base 35 removably attached to the second attaching part 34, and a second gripping part 36 rotatably provided to the second base 35. The second attaching part 34 and the second gripping part 36 are provided to a tip of the second arm 30. Details of the second hand part 33 will be described later.

The first arm 20 and the second arm 30 having the structure described above each have the joints J1 to J4. The first arm 20 and the second arm 30 are each provided with, for example, driving servo motors (not illustrated) corresponding to the joints J1 to J4 and with encoders (not illustrated) which detect rotational angles of the respective servo motors. Moreover, the rotation axis L1 of the first a-link 21a of the first arm 20 and the rotation axis L1 of the second a-link 31a of the second arm 30 are on the same straight line, and the first a-link 21a of the first arm 20 and the second a-link 31a of the second arm 30 are disposed with a height difference therebetween.

Figure 2:
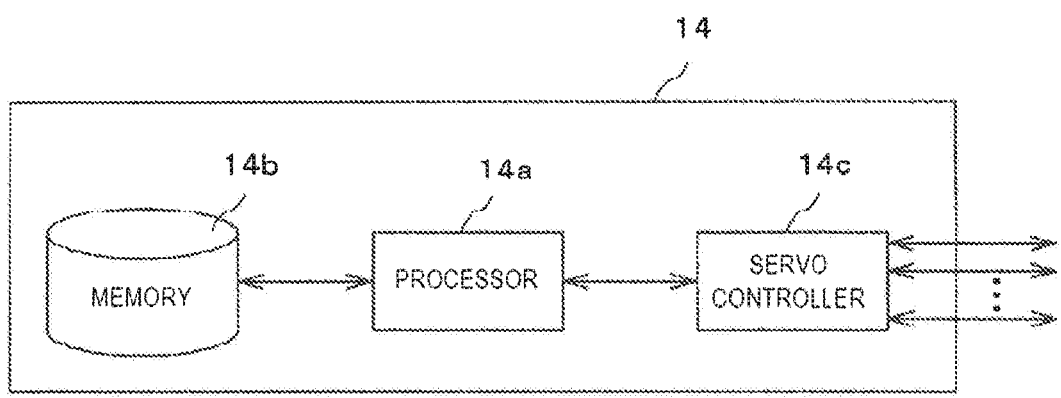
FIG. 2 is a functional block diagram schematically illustrating a structure of a controller of the robot of FIG. 1.

As illustrated in FIG. 2, the controller 14 includes a processor 14a such as a CPU, a memory 14b such as a ROM or a RAM, and a servo controller 14c. The controller 14 is, for example, a robot controller including a computer such as a microcontroller. The controller 14 may include a control unit that performs a centralized control or may include a plurality of control units which collaborate mutually to carry out a distributed control.

The memory 14b stores information, such as a basic program as a robot controller, various fixed data, etc. The processor 14a controls various operations of the robot 12 by reading and executing software, such as the basic program in the memory 14b. That is, the processor 14a generates control commands for the robot 12, and outputs them to the servo controller 14c. The servo controller 14c is configured to control driving of the servo motors corresponding to the joints J1 to J4 of each of the first arm 20 and the second arm 30 based on the control commands generated by the processor 14a.

The following describes the first hand part 23 and the second hand part 33 with reference to FIG. 1 and FIGS. 3 to 6. The first hand part 23 includes the first attaching part 24, the first base 25, the first gripping part 26, and the rotary body 27. The second hand part 33 includes the second attaching part 34, the second base 35, and the second gripping part 36.

As illustrated in FIG. 1, the first base 25 is removably attached to the first wrist part 22 via the first attaching part 24. The second base 35 is removably attached to the second wrist part 32 via the second attaching part 34. The first attaching part 24 and the second attaching part 34 each include a pair of rod-like members. The distance between the pair of rod-like members is adjustable. Thus, the first base 25 is sandwiched by the pair of rod-like members, and then the first base 25 is attached to the first wrist part 22. The second base 35 is sandwiched by the pair of rod-like members, and then the second base 35 is attached to the second wrist part 32.

As illustrated in FIGS. 3 to 6, the first gripping part 26 includes a pair of first sandwiching members 28 and a first adjusting part 29 which changes the distance between the first sandwiching members 28 provided in a pair. The first sandwiching members 28 are an upper first sandwiching member 28a and a lower first sandwiching member 28b, and proximal ends of these members are connected to the first adjusting part 29. The upper first sandwiching member 28a includes a first lateral-surface upper portion extending upwardly from the proximal end thereof and a first upper surface portion curving from the first lateral-surface upper portion and extending in horizontal directions. The lower first sandwiching member 28b includes a first lateral-surface lower portion extending downwardly from the proximal end thereof and a first lower surface portion curving from the first lateral-surface lower portion and extending in the horizontal directions.

The first gripping part 26 is rotatably attached to the first base 25 via a first rotating shaft 26a. The first rotating shaft 26a is orthogonal to the rotation axis L3 (see FIG. 1) of the first wrist part 22, is parallel with the first upper surface portion and the first lower surface portion, and extends in the horizontal directions. By the first rotating shaft 26a, the first gripping part 26 may be turned upside down.

The rotary body 27 has, for example, a cylindrical shape or a discoid shape, and is connected with the first gripping part 26 via the first rotating shaft 26a. One end of the first rotating shaft 26a is connected with the first gripping part 26 and the other end of the first rotating shaft 26a is connected with the rotary body 27 in such a manner that the center of a circle defined by the rotary body 27 corresponds to the center of the first gripping part 26 in the directions orthogonal to the first rotating shaft 26a. The rotary body 27 is a pinion having a circumferential surface provided with contiguous first teeth 27a, and the first teeth 27a engage with second teeth 15a of the strip member 15. Note that the point at which the first gripping part 26 is connected to the first rotating shaft 26a is not limited to the center of the first gripping part 26 in the directions orthogonal to the first rotating shaft 26a.

The strip member 15 is disposed at a side of the robot 12 and is, for example, a plate-like body extending linearly. The strip member 15 is, for example, a rack being a plate-like body having an upper surface provided with the contiguous second teeth 15a. The second teeth 15a are aligned in the direction in which the strip member 15 extends, and extend in directions orthogonal to the direction in which the strip member 15 extends. An upper surface of the strip member 15, i.e., upper ends of the second teeth 15a in this embodiment, are in one plane in the horizontal directions.

The second gripping part 36 includes a pair of second sandwiching members 37 and a second adjusting part 38 which changes the distance between the second sandwiching members 37 provided in a pair. The second sandwiching members 37 are an upper second sandwiching member 37a and a lower second sandwiching member 37b, and proximal ends of these members are connected to the second adjusting part 38. The upper second sandwiching member 37a includes a second lateral-surface upper portion extending upwardly from the proximal end thereof and a second upper surface portion curving from the second lateral-surface upper portion and extending in the horizontal directions. The lower second sandwiching member 37b includes a second lateral-surface lower portion extending downwardly from the proximal end thereof and second lower surface portion curving from the second lateral-surface lower portion and extending in the horizontal directions.

The second gripping part 36 is rotatably attached to the second base 35 via a second rotating shaft 36a. The second rotating shaft 36a is orthogonal to the rotation axis L3 (see FIG. 1) of the wrist part, is parallel with the second upper surface portion and the second lower surface portion, extends in the horizontal directions, and is parallel with the first rotating shaft 26a. By the second rotating shaft 36a, the second gripping part 36 may be turned upside down.

With reference to FIGS. 3 to 6, the following describes a procedure for inverting the workpiece 11 through the use of the robot 12 having the structure described above. This procedure is governed by the controller 14. Although a substrate 11a is mounted on a front surface of a case 11b in the following description, the workpiece 11 is not limited thereto. Although the workpiece 11 is transferred between a conveyor belt 40 and a work robot 41 and the workpiece 11 is inverted in front of the work robot 41 in the following description, the movement and inversion of the workpiece 11 are not limited thereto.

As illustrated in FIG. 3, the conveyor belt 40 is placed in front of the robot 12. The conveyor belt 40 transfers the workpiece 11 including the case 11b and the substrate 11a mounted on the front surface of the case 11b, with the front surface of the workpiece 11 facing upward. The conveyor belt 40 is provided with an elevating part 40a placed in front of the robot 12. When the workpiece 11 reaches the point on the elevating part 40a, the elevating part 40a ascends to lift the workpiece 11 to above a conveying surface of the conveyor belt 40. When the workpiece 11 is placed on the elevating part 40a, the elevating part 40a descends and puts the workpiece 11 back on the conveying surface of the conveyor belt 40.

The work robot 41 is placed behind the robot 12. The work robot 41 is, for example, a horizontal articulated dual-arm robot, a horizontal articulated robot, or a vertical articulated robot. The work robot 41 includes a pair of robot arms 41a and 41b, feeds a back plate 42 by the robot arm 41a, and feeds bolts 43 through the robot arm 41b.

Figure 4:
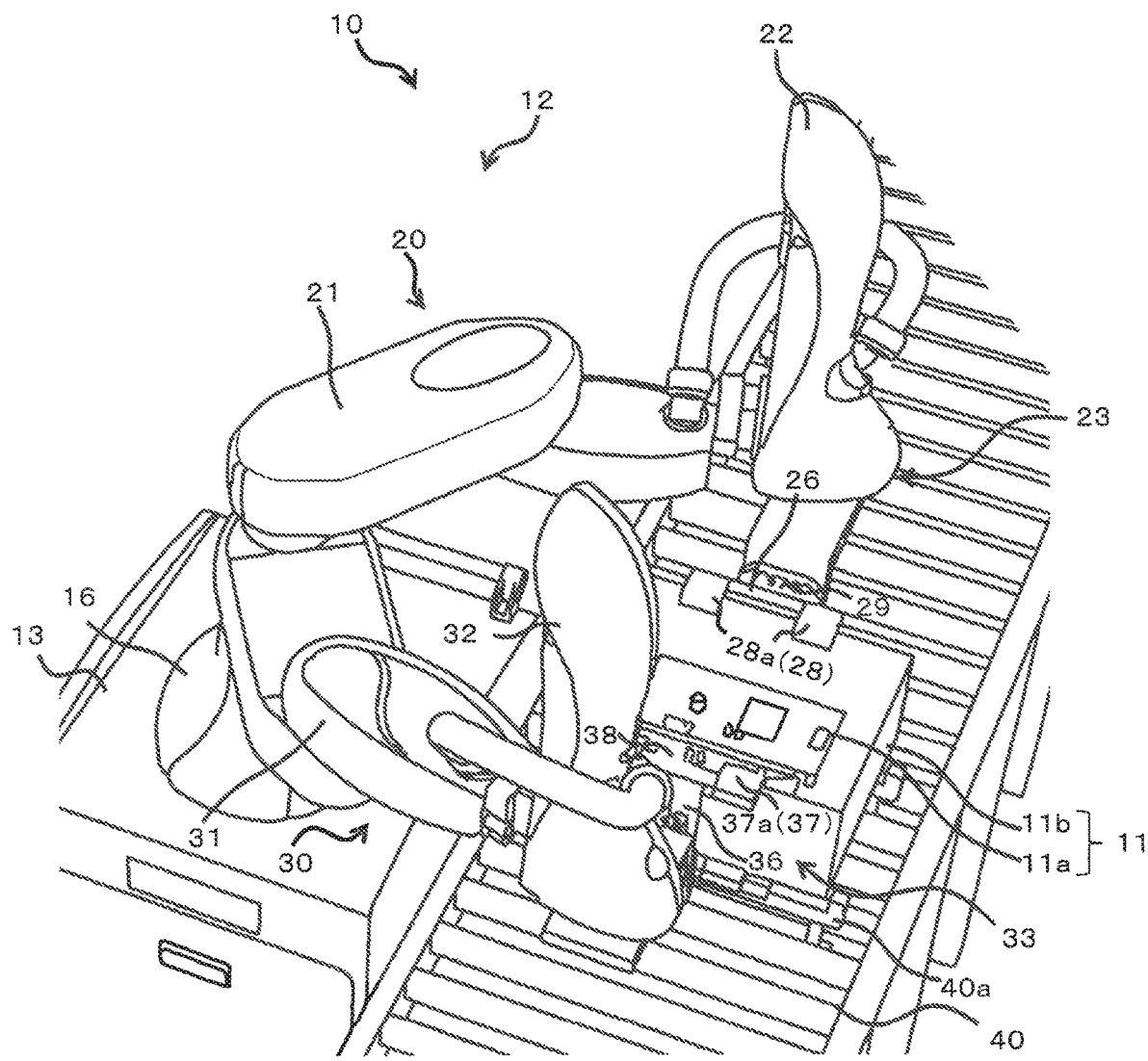
FIG. 4 is a perspective view schematically illustrating a state in which the workpiece is gripped.

First, when the workpiece 11 is transferred by the conveyor belt 40 to the front of the robot 12, the workpiece 11 is lifted by the elevating part 40a. As illustrated in FIG. 4, the workpiece 11 is sandwiched between the first gripping part 26 and the second gripping part 36 in the left-and-right directions, with a left side of the workpiece 11 in contact with the first gripping part 26 and a right side of the workpiece 11 in contact with the second gripping part 36.

The distance between the upper first sandwiching member 28a and the lower first sandwiching member 28b is reduced by the first adjusting part 29, whereas the distance between the upper second sandwiching member 37a and the lower second sandwiching member 37b is reduced by the second adjusting part 38. The workpiece 11 is sandwiched in the vertical directions between the pair of first sandwiching members 28 and between the pair of second sandwiching members 37. Thus, the first rotating shaft 26a is located at the center of the workpiece 11 in the directions orthogonal to the first rotating shaft 26a.

Thus, the workpiece 11 is gripped by the first gripping part 26 and the second gripping part 36 such that the workpiece 11 runs between the first gripping part 26 and the second gripping part 36. With the distance between the first gripping part 26 and the second gripping part 36 unchanged, the first arm 20 and the second arm 30 revolve about the rotation axis L1 (see FIG. 1). Thus, the robot 12 turns round to face the work robot 41 while holding the workpiece 11. The workpiece 11 is shifted from the conveyor belt 40 to the front of the work robot 41.

Figure 5:
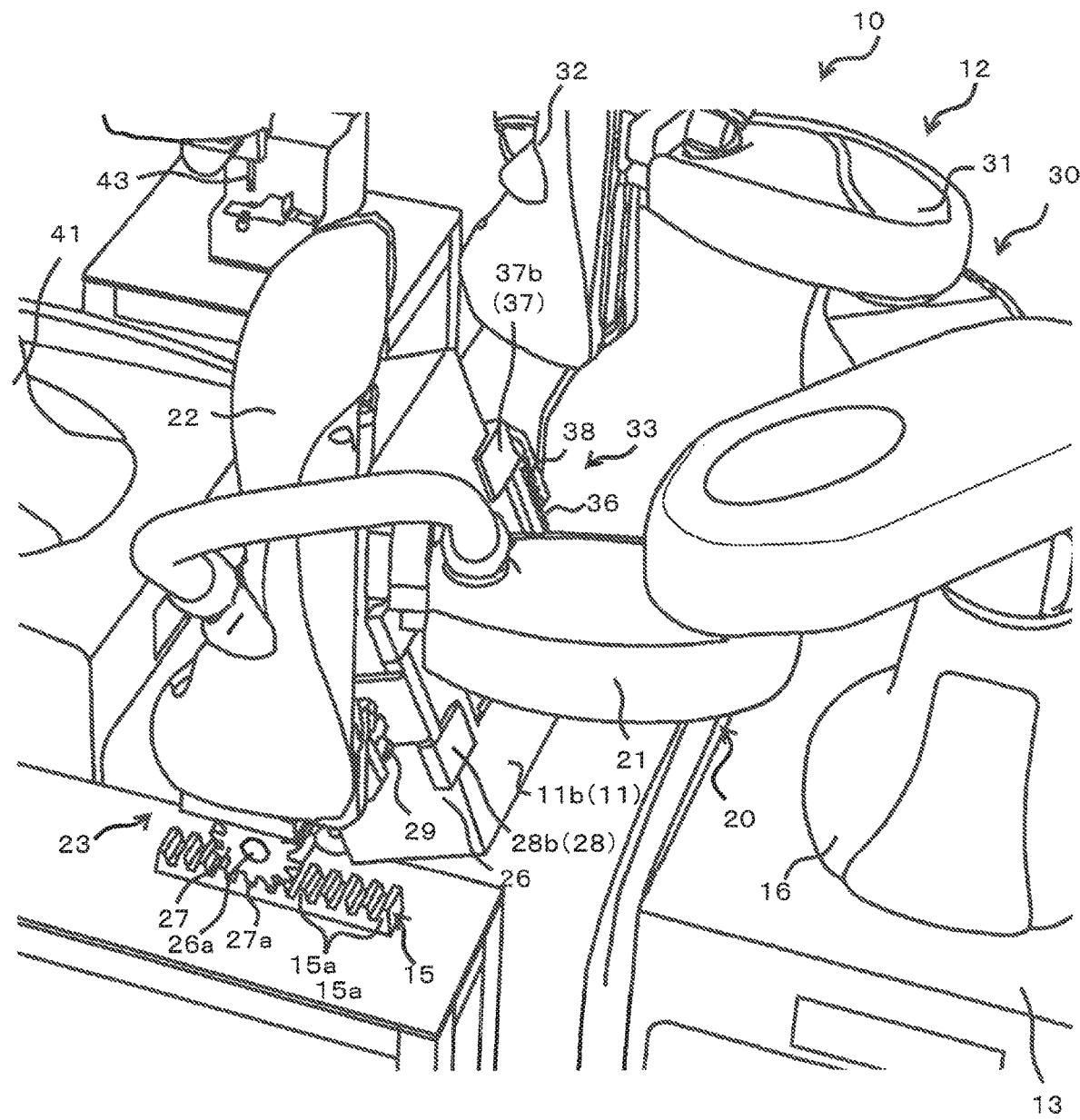
FIG. 5 is a perspective view schematically illustrating a state in which the workpiece is inverted.

The rotary body 27 is now placed in front of the strip member 15. As illustrated in FIG. 5, the first rotating shaft 26a of the rotary body 27 is orthogonal to the directions in which the strip member 15 extends. In this state, the first arm 20 places the rotary body 27 onto the strip member 15, and moves the first hand part 23 from the conveyor belt 40 side toward the work robot 41 in the direction in which the strip member 15 extends. Thus, the rotary body 27 rotates in the direction in which the strip member 15 extends, with the first teeth 27a engaging with the second teeth 15a of the strip member 15. The first gripping part 26 rotates in conjunction with the rotation of the rotary body 27, and the workpiece 11 gripped by the first gripping part 26 rotates accordingly.

In this process, the second arm 30 moves the second hand part 33 in conjunction with the movement caused by the first hand part 23. Thus, due to the workpiece 11 running between the first gripping part 26 and the second gripping part 36, the rotation of the first gripping part 26 is transferred to the second gripping part 36, causing the second gripping part 36 to rotate. Then, the workpiece 11 is inverted while approaching the work robot 41.

Figure 6:
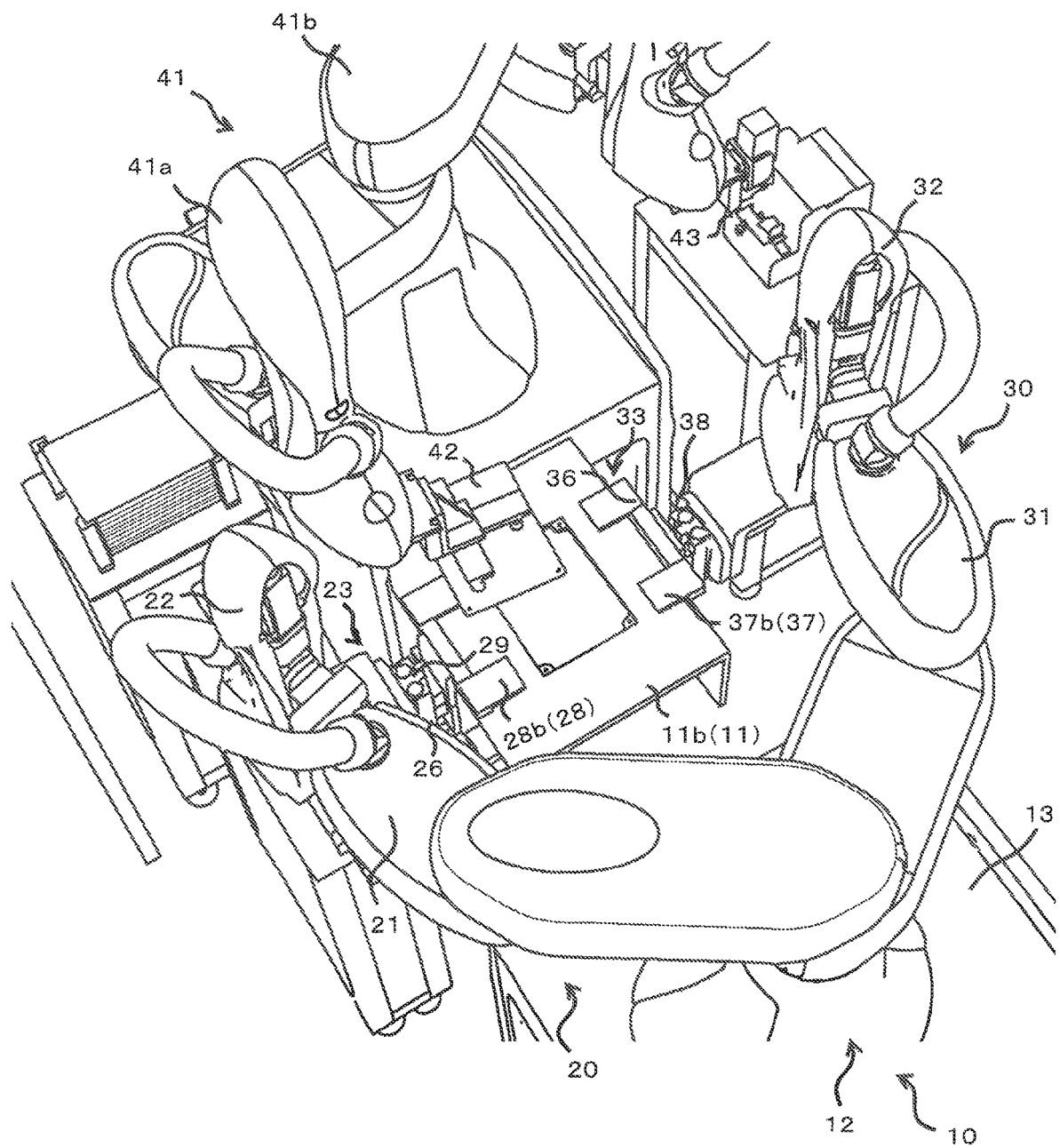
FIG. 6 is a perspective view schematically illustrating a state in which a back plate is fitted to the workpiece.

As illustrated in FIG. 6, the workpiece 11 is placed in front of the work robot 41, with a back surface of the workpiece 11 facing upward. The work robot 41 causes the robot arm 41a to grip the back plate 42 and place the back plate 42 onto the back surface of the workpiece 11 while bringing the holes of the back plate 42 into alignment with corresponding holes of the workpiece 11. The work robot 41 causes the robot arm 41b to grip the bolts 43, insert them through the holes of the back plate 42 and the workpiece 11, and tighten the bolts. As a result of the tightening of bolts at the respective holes, the back plate 42 is fitted to the workpiece 11.

When the back plate 42 is fixed to the workpiece 11, the rotary body 27 is placed at the rear of the strip member 15 as opposed to the state in FIG. 5. The first arm 20 places the rotary body 27 onto the strip member 15, and moves the first hand part 23 from the work robot 41 side to the conveyor belt 40 side in the direction in which the strip member 15 extends. Thus, the rotary body 27 moves linearly in the direction in which the strip member 15 extends, and rotates while the first teeth 27a engage with the second teeth 15a of the strip member 15. Consequently, the workpiece 11 is inverted.

Then, the workpiece 11 is placed on the elevating part 40a, with the back surface of the workpiece 11 facing downward. The distance between the first gripping part 26 and the second gripping part 36, the distance between the first sandwiching members 28 provided in a pair, and the distance between the second sandwiching members 37 provided in a pair are increased to release the workpiece 11. Then, the elevating part 40a descends, and the workpiece 11 is transferred by the conveyor belt 40.

In this embodiment, while the workpiece 11 is gripped by the first gripping part 26, the rotary body 27 moves relative to the strip member 15 in contact with the rotary body 27 in the direction of in which the strip member 15 extends. Thus, the rotation of the rotary body 27 causes the motion which enables inversion of the workpiece 11 in a small place irrespective of the size of the workpiece 11.

Moreover, the first rotating shaft 26a is located, in the directions orthogonal thereto, at the center the circle defined by the rotary body 27, at the center of the first gripping part 26, and at the center of the workpiece 11. Thus, the rotary body 27, the first gripping part 26, and the workpiece 11 rotate about their respective centers, taking up less space.

In the state in which the workpiece 11 is gripped by the first gripping part 26 and the second gripping part 36, the first arm 20 places the rotary body 27 onto the strip member 15 and moves the rotary body 27 in the direction in which the strip member 15 extends. Thus, the first arm 20 and the second arm 30 move the workpiece 11 via the first gripping part 26 and the second gripping part 36 and cause the rotary body 27 to move on the strip member 15 and rotate, thereby inverting the workpiece 11. The first arm 20 and the second arm 30 which serve as power sources enable the movement and inversion of the workpiece 11.

The rotary body 27 is a pinion being a cylindrical body having a circumferential surface provided with the first teeth 27a, whereas the strip member 15 is a rack provided with the second teeth 15a designed to engage with the first teeth 27a. The first teeth 27a engage with the second teeth 15a, so that the rotary body 27 rotates unfailingly, enabling an efficient inversion of the workpiece 11.

The workpiece inverting device 10 includes the robot 12 including the first arm 20 and the second arm 30, and the strip member 15. Thus, in the workpiece inverting device 10, the first gripping part 26 and the rotary body 27 are removably attached to the first wrist part 22 via the first attaching part 24, and the second gripping part 36 is removably attached to the second wrist part 32 via the second attaching part 34. The general-purpose robot 12 including the first gripping part 26, the rotary body 27, and the second gripping part 36 provided with replaceable tips necessitates only replacement of these tips when inverting the workpiece 11.

Embodiment 2

Figure 7:
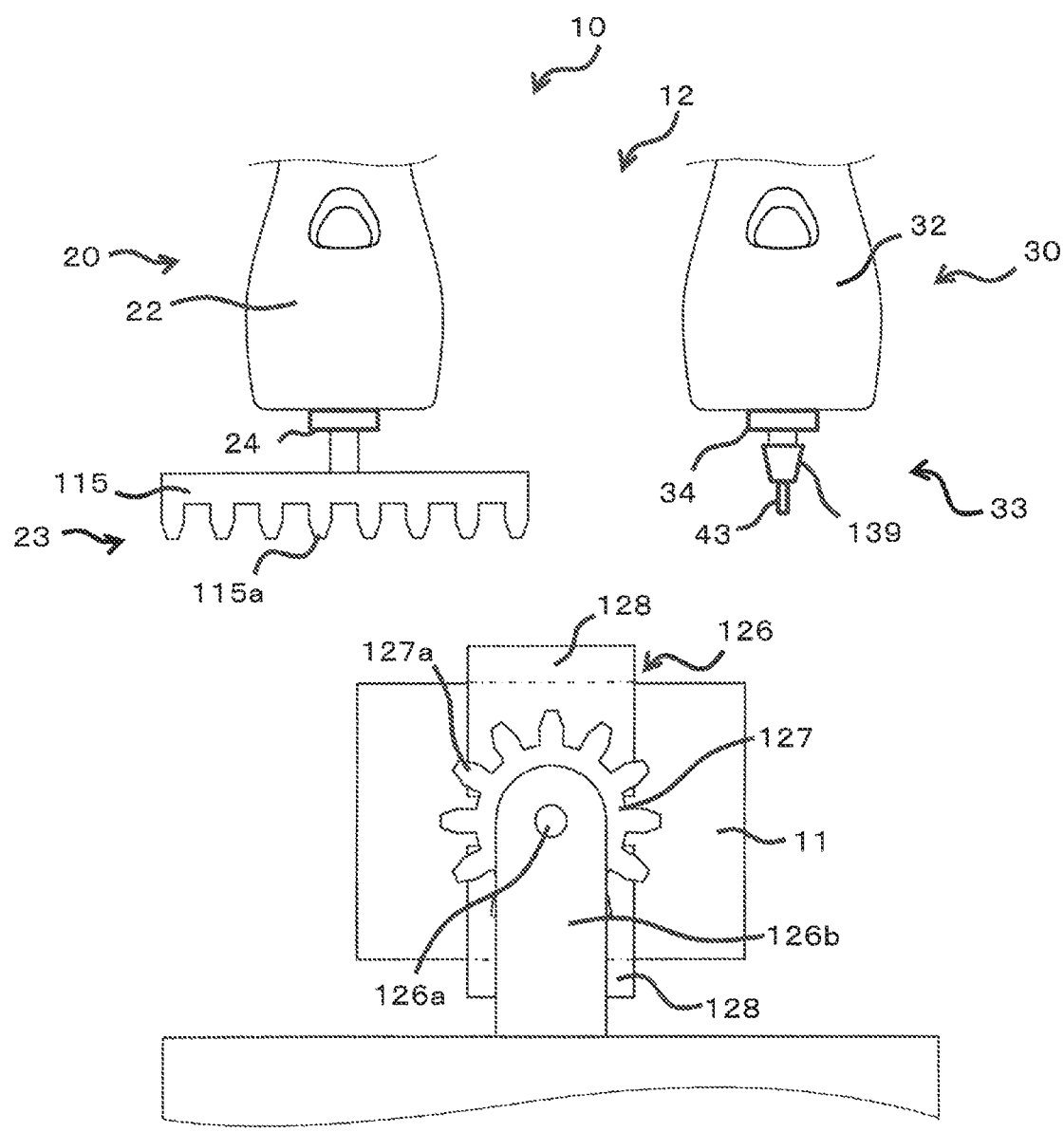
FIG. 7 is a plan view schematically illustrating a workpiece inverting device according to Embodiment 2.

In the workpiece inverting device 10 according to Embodiment 1, the first arm 20 is provided with the first gripping part 26 and the rotary body 27. In the workpiece inverting device 10 according to Embodiment 2, the first arm 20 is provided with a strip member 115 as illustrated in FIG. 7.

The first hand part 23 includes the first attaching part 24 and the strip member 115 removably attached to the first wrist part 22 via the first attaching part 24. The first attaching part 24 and the strip member 115 are provided to the tip of the first arm 20.

The strip member 115 is, for example, a plate-like body extending linearly. The strip member 115 is, for example, a rack being a plate-like body having a lower surface provided with contiguous second teeth 115a. The second teeth 115a are aligned in the directions in which the strip member 115 extends. A lower surface of the strip member 115, i.e., lower ends of the second teeth 115a in this embodiment are in one plane in the horizontal directions.

A first gripping part 126 and a rotary body 127 are provided to, for example, a workbench. The rotary body 127 has, for example, a cylindrical shape or a discoid shape. For example, the rotary body 127 is a pinion having a circumferential surface provided with contiguous first teeth 127a, and the first teeth 127a are designed to engage with second teeth 115a of the strip member 115. A first rotating shaft 126a passes through the center of the circle defined by the rotary body 127. The first rotating shaft 126a is horizontally and rotatably supported by a pedestal 126b on the workbench.

The first gripping part 126 is connected with the rotary body 127 via the first rotating shaft 126a. For example, in the directions orthogonal to the first rotating shaft 126a, the center of the circle defined by the rotary body 127 is connected with the center of the first gripping part 126 via the first rotating shaft 126a. Note that the point at which the first gripping part 126 is connected to the first rotating shaft 126a is not limited to the position described above.

The first gripping part 126 includes, for example, a pair of first sandwiching members 128. The distance between the first sandwiching members 128 provided in a pair is adjusted by an actuator (not illustrated). The workpiece 11 is sandwiched between the first sandwiching members 128 provided in a pair and is gripped by these members. The first gripping part 126 is rotatably attached to the pedestal 126b via the first rotating shaft 126a, and may be turned upside down by the first rotating shaft 126a.

The second hand part 33 includes the second attaching part 34 and a work part 139 removably attached to the second wrist part 32 via the second attaching part 34. The second attaching part 34 and the work part 139 are provided to the tip of the second arm 30. The work part 139 may, for example, feed a back surface member, feed and tighten the bolts 43, and work on the workpiece 11 which has been inverted.

While the workpiece 11 is gripped by the first gripping part 126, with the front surface of the workpiece 11 facing upward, the rotary body 127 moves relative to the strip member 115 in contact with the rotary body 127 in the direction in which the strip member 115 extends. Consequently, the workpiece 11 is inverted. Specifically, the first arm 20 places the strip member 115 onto the rotary body 127 such that the first rotating shaft 126a is orthogonal to the directions in which the strip member 115 extends. Then, the first hand part 23 is moved in the direction in which the strip member 115 extends, so that the rotary body 127 rotates in the direction in which the strip member 115 extends, with the first teeth 127a of the rotary body 127 engaging with the second teeth 115a of the strip member 115. The first gripping part 126 rotates in conjunction with the ration of the rotary body 127, and the workpiece 11 gripped by the first gripping part 126 rotates accordingly.

Consequently, the workpiece 11 is inverted, with its back surface facing upward. The second arm 30 moves the second hand part 33, and then the work part 139 works on the workpiece 11 by feeding the bolts 43 to the back surface of the workpiece 11 and tightening them and/or by feeding a back plate.

When the work on the back surface of the workpiece 11 is finished, the first arm 20 places the strip member 115 onto the rotary body 127 and moves the first hand part 23 in the direction in which the strip member 115 extends. Thus, the rotary body 127 moves relative to the strip member 115 and rotates accordingly, with the first teeth 127a engaging with the second teeth 115a of the strip member 115. Consequently, the workpiece 11 is inverted.

In this embodiment, in the state in which the workpiece 11 is gripped by the first gripping part 126, the first arm 20 moves the strip member 115 in contact with the rotary body 127 in the direction in which the strip member 115 extends. This movement causes a rotation of the rotary body 127 connected with the first rotating shaft 126a, and the rotation translates into the motion which enables inversion of the workpiece 11 in a small space irrespective of the size of the workpiece 11.

The strip member 115 moves linearly relative to the rotary body 127, and thus such a motion is simple and easy to control. Furthermore, a pinion is used as the rotary body 127 and a rack is used as the strip member 115. This enables more reliable and efficient inversion of the workpiece 11. The workpiece inverting device 10 includes: the robot 12 including the first arm 20; the first gripping part 26; and the rotary body 27, and thus causes the replaceable general-purpose robot 12 to invert the workpiece 11.

Other Embodiments

In Embodiment 1, the workpiece 11 is gripped by the first gripping part 26 and the second gripping part 36 while the rotary body 27 in contact with the strip member 15 is moved. Alternatively, the workpiece 11 may be gripped by the first gripping part 26 while the rotary body 27 in contact with the strip member 15 is moved. If this is the case, the second hand part 33 may include, in place of the second gripping part 36, a work part which feeds and tightens the bolts 43 or executes other specific work.

In all of the embodiments described above, pinions are used as the rotary bodies 27 and 127 and racks are used as the strip members 15 and 115. Note that the rotary bodies 27 and 127 are not limited to the pinions and the strip members 15 and 115 are not limited to the racks, and may be other objects as long as the rotary bodies 27 and 127 are rotatable on the strip members 15 and 115, respectively. For example, the rotary body 27 or 127 may be a circular cylinder or a disk which is not provided with the first teeth 27a or 127a. The strip member 15 or 115 may be a flat plate which is not provided with the second teeth 15a or 115a. The circumferential surfaces of the rotary bodies 27 and 127 to come into contact with the strip members 15 and 115 and the flat surfaces of the strip members 15 and 115 to come into contact with the rotary bodies 27 and 127 are formed from materials which may lead to a great coefficient of friction between each circumferential surface and each flat surface. Thus, high friction is produced between the rotary body 27 and the strip member 15 and between the rotary body 127 and the strip member 115, thus causing the rotary bodies 27 and 127 to rotate on the strip members 15 and 115, respectively.

In all of the embodiments described above, the strip members 15 and 115 are plate-like bodies extending linearly, and each of the upper surface of the strip member 15 and the lower surface of the strip member 115 is in one plane in the horizontal directions and is flat. The strip members 15 and 115 may have any other shape as long as they extend in a certain direction. For example, the upper surface of the strip member 15 and the lower surface of the strip member 115 may have a recess or a projection. Alternatively, the upper surface of the strip member 15 and the lower surface of the strip member 115 may be curved surfaces.

Although the first hand part 23 is coupled to the first wrist part 22 via the first attaching part 24 in the embodiments described above, the first hand part 23 may be directly coupled to the first wrist part 22. Furthermore, although the second hand part 33 is coupled to the second wrist part 32 via the second attaching part 34, the second hand part 33 may be directly coupled to the second wrist part 32.

From the above description, it is apparent for a person skilled in the art that many improvements and other embodiments of the present disclosure are possible. Therefore, the above description is to be interpreted only as illustration, but is provided in order to teach a person skilled in the art the best modes that implement the present disclosure. Details of the structures and/or functions of the present disclosure may substantially be changed without departing from the spirit of the present disclosure.

INDUSTRIAL AVAILABILITY

The present disclosure is useful for the workpiece inverting device, etc. capable of inverting a workpiece in a small space.

DESCRIPTION OF REFERENCE CHARACTERS

10: Inverting Device
11: Workpiece
12: Robot
15: Strip Member
15a: Second Teeth
20: First Arm (Arm)
26: First Gripping Part (Gripping Part)
26a: First Rotating Shaft (Rotating Shaft)
27: Rotary Body
27a: First Teeth
30: Second Arm
33: Second Hand Part
36: Second Gripping Part
115: Strip Member
115a: Second Teeth
126: First Gripping Part (Gripping Part)
126a: First Rotating Shaft (Rotating Shaft)

127: Rotary Body
127*a*: First Teeth

The invention claimed is:

1. A workpiece inverting device, comprising:
a gripping part configured to rotatably grip a workpiece;
a rotary body rotatable about a rotating shaft and connected to the gripping part;
a strip member extending in a direction orthogonal to the rotating shaft; and
a robot including a first arm and a second arm, the first arm configured to move in a state in which a tip of the first arm is provided with the strip member, the second arm being provided with a work part at a tip of the second arm,
wherein while the workpiece is gripped by the gripping part, the strip member is moved in contact with the rotary body in the direction in which the strip member extends.

2. The workpiece inverting device according to claim 1, wherein
the rotary body is a pinion being a cylindrical body having a circumferential surface provided with first teeth, and
the strip member is a rack provided with second teeth to engage with the first teeth.

* * * * *